United States Patent [19]
George

[11] 3,880,481
[45] Apr. 29, 1975

[54] BEARING ASSEMBLY

[75] Inventor: Richard F. George, Muskegon, Mich.

[73] Assignee: Keene Corporation, New York, N.Y.

[22] Filed: Mar. 8, 1974

[21] Appl. No.: 449,515

[52] U.S. Cl. ............................. 308/191; 308/174
[51] Int. Cl. .......................................... F16c 33/00
[58] Field of Search ............ 308/191, 192, 174, 201

[56] References Cited
UNITED STATES PATENTS

| | | | |
|---|---|---|---|
| 1,457,184 | 5/1923 | Munson | 308/191 |
| 2,988,408 | 6/1961 | De Luca | 308/191 |
| 3,043,634 | 5/1962 | Coley | 308/174 |
| 3,552,813 | 1/1969 | Brescia, Jr. et al. | 308/191 |

Primary Examiner—M. Henson Wood, Jr.
Assistant Examiner—Richard A. Bertsch
Attorney, Agent, or Firm—Johnson, Dienner, Emrich & Wagner

[57] ABSTRACT

Load bearing apparatus for use, for example, with an outer stationary component adapted to be secured to the frame of a lift truck and an inner rotatable component, such as a caster wheel assembly, an angular contact radial and thrust bearing assembly therefore having inner and outer elastically deflectable ball bearing races having between them opposed inner load bearing ball engaging surfaces and outer cylindrical surfaces associated with the outer stationary component and inner rotatable component with the load bearing ball engaging surfaces of the races in opposed facing relation with respect to each other, and between which adjacent elastically deflectable load bearing balls are in spaced apart relation and disposed with small diametral clearance with respect to the ball engaging surface of the bearing races, and in which spacer means is provided between adjacent load bearing balls so that the load bearing balls extend circumferentially fully between the bearing races, the ball bearing races having clearance fits with respect to the outer stationary component and inner rotatable component, and with the ball engaging surfaces of the races being of configurations to provide contact angles of the load bearing balls, therewith to effect elastic deflection of the races and load bearing balls at their points of contact to automatically provide the most suitable load carrying capacity for the load bearing balls with respect to the ball engaging surfaces of the races to accommodate variable thrust loads applied to the outer stationary component.

8 Claims, 8 Drawing Figures

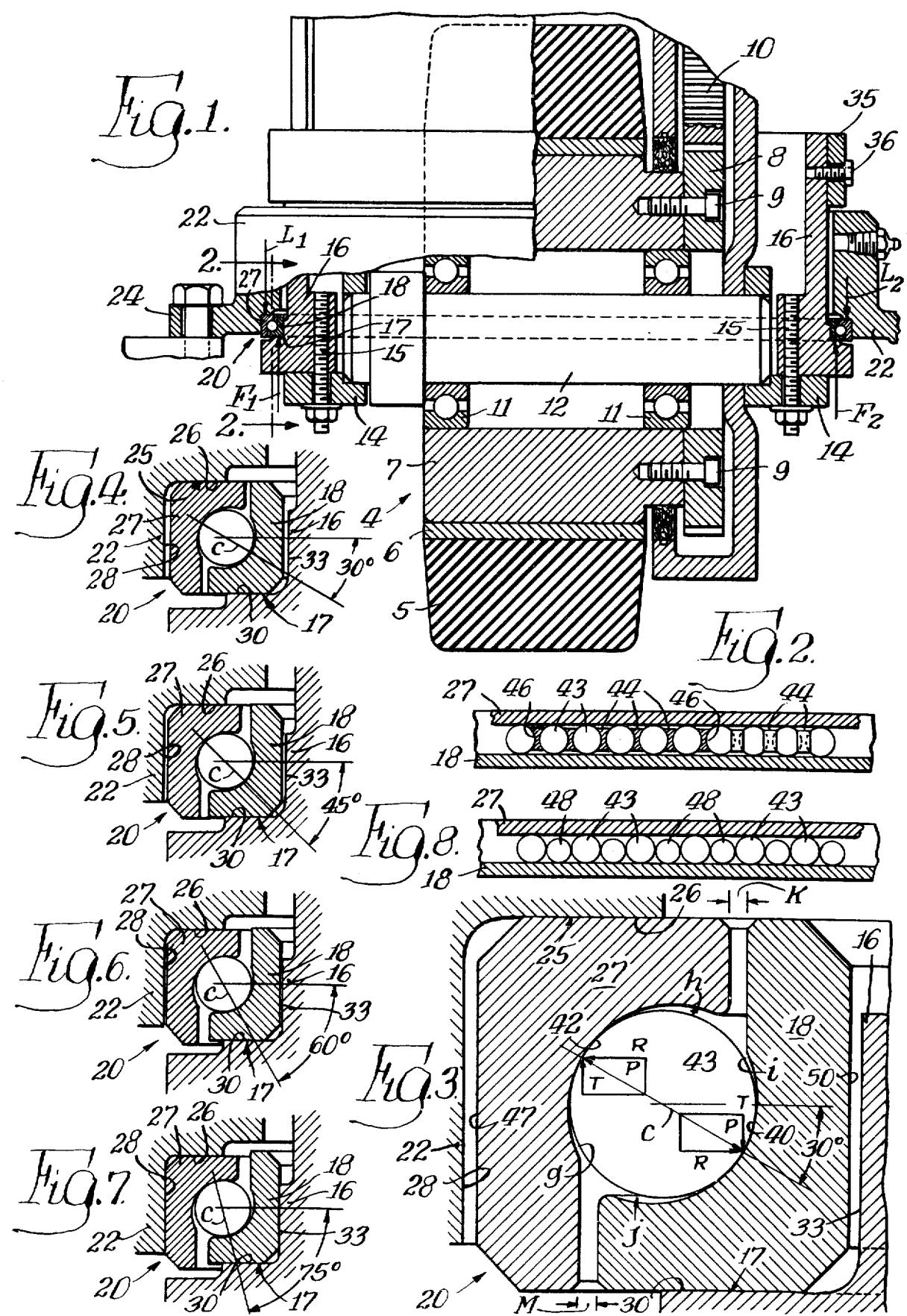

BEARING ASSEMBLY

BACKGROUND OF THE INVENTION

The invention is concerned with a load bearing apparatus embodying an outer stationary component, an inner rotatable component, and an angular contact radial and thrust bearing assembly between the inner and outer components. Known bearing assemblies in common use today embodying bearing assemblies often comprise a full complement of load bearing balls with no separation between the load bearing balls. These known bearing assemblies are generally suitable for radial loads or else for thrust loads but are not designed to automatically adjust to changing load conditions. It is also known to provide radial and thrust load bearing assemblies but these known assemblies while suitable for radial loads are not of constructions in which the load bearing balls are associated with load bearing surfaces of the races to automatically maximize the load bearing contact angles of the load bearing balls with the ball engaging surfaces of the bearing races in response to changing thrust load conditions.

THE INVENTION

The present invention concerns itself with a load bearing apparatus embodying an angular contact radial and thrust bearing assembly which typically, as aforenoted, has utility for use in a lift truck having a caster wheel assembly. The load bearing apparatus of the invention comprises an outer housing component, an inner rotatable component, and an angular contact radial and thrust bearing assembly having outer and inner bearing races associated, respectively, with the outer housing and inner rotatable component with the ball engaging surfaces of the races in opposed facing relation in respect to each other. Angular contact load bearing balls are circumferentially arranged between the races with small diametral clearance with respect to the bearing engaging surfaces of the bearing races such, for example, as disclosed in a catalog identified as Catalog No. 300, published by the Keene Corporation, Kaydon Bearing Division of Muskegon, Michigan, copyrighted 1969. The load bearing balls are alternately spaced apart by spacer means which may comprise balls of smaller diameter than that of the load bearing balls, or by alternate spacing members of like generally cylindrical cross sectional configuration having concave recesses providing ball engaging surfaces in opposite faces thereof facing the load bearing balls and of a radius slightly in excess of the radius of the load bearing balls providing for minimum frictional contact between the load bearing balls and the concave surfaces of the spacing members, and so that the load bearing balls extend circumferentially fully between the races. An important aspect of the invention resides in providing a clearance fit between the outer cylindrical surface of the outer race with an inner cylindrical surface of the outer housing for relative radial movement with respect thereto, and a clearance fit of the inner cylindrical surface of the inner race with an outer cylindrical surface of the rotatable component for relative limited radial movement. Thus the outer race mayelastically expand and the inner race may elastically contract as a thrust load is applied to the outer housing component, this expansion and contraction resulting in an increase in the internal clearance and a consequent increase in the contact angles of the load bearing balls with respect to the load bearing surfaces of the bearing races of the outer housing component and the inner rotatable component. The contact angles are thus automatically changed as the bearing races are elastically deflected and thereby provide the most suitable load bearing capacity for the load condition.

IN THE DRAWINGS

FIG. 1 is an elevation view of a typical caster wheel assembly for a lift truck with certain parts being shown in cross-section and in which the present invention has been incorporated;

FIG. 2 is a developed cross-sectional view of an angular contact radial and thrust bearing embodied in the assembly of FIG. 1 with the view being taken substantially along the line 2—2 of FIG. 1 looking in the direction indicated by the arrows;

FIG. 3 is an enlarged cross-sectional view of opposed inner and outer bearing races of the load bearing ball bearing at the left hand side of the bearing as seen in FIG. 1 and showing an initial or nominal contact angle of about 30°, of the load bearing balls with the load bearing surfaces of the inner and outer races, and upon which the load vectors for thrust loads are indicated;

FIG. 4 is a smaller view of the outer and inner races and load bearing balls of FIG. 3, again shown mounted in portions of the outer stationary component and inner rotatable component in which the outer and inner races are, respectively, mounted with the view being on a scale about twice the size of a typical load bearing apparatus constructed in accordance with the invention;

FIG. 5 is a view similar to FIG. 4 but in which a thrust load has been applied to the outer stationary component to provide a contact angle of about 45° of the load bearing balls with the load bearing surfaces of the inner and outer races;

FIG. 6 is a view similar to FIGS. 4 and 5, but in which an applied thrust load provides a contact angle of about 60°;

FIG. 7 is a view similar to FIGS. 4 through 6, in which an applied thrust load provides a contact angle of about 75°;

FIG. 8 is a view similar to FIG. 2 but in which the spacer means between alternate load bearing balls are defined by balls of slightly less diameter than the load bearing ball bearings.

DESCRIPTION OF PREFERRED EMBODIMENTS OF INVENTION

Referring now to FIG. 1 there is illustrated a typical caster wheel assembly for a lift truck embodying a wheel 4 having a rubber tire 5 which is bonded to a steel tire rim 6 which is press fitted onto a hub 7. A gear 8 may be bolted as at 9 to hub 7 which rotated by a meshing drive gear 10 driven by any suitable known means so as to transmit torque to hub 7. Within hub 7 there may be provided a pair of spaced apart bearings 11 mounted on an axle shaft 12. Each end of the axle 12 is secured in an end bracket 14 which is fastened as by threaded studs 15 to an inner rotatable component, such as an inner housing 16, which is formed with an annular shoulder 17, providing a race seat for the inner race 18 of the angular contact and thrust bearing 20 of the invention. A stationary outer component, such as an outer housing 22, has two or more flanges, one being shown at 24 in FIG. 1, for attachment to the structure of the lift truck. The stationary outer component 22 is also formed with an annular shoulder 25, providing a race seat for the outer race 27 of the angular contact and thrust bearing of the invention to provide for rotation of the inner rotatable component or inner rotatable housing 16 with respect to the stationary component or stationary housing 22.

The annular shoulder 25 as is formed with a first base surface 26 and a first inner cylindrical surface 28 extending at right angles to the base surface 26. The annular shoulder 17 is also formed with a second base surface 30, and a second outer cylindrical surface 33, extending at right angles with respect to the second base surface 30 and in a direction opposite that of the first cylindrical surface 28 of the stationary housing 22.

The afore described structure may be employed with the wheel used to steer, for example, a three-wheeled truck. The invention of course may be employed in a four-wheeled truck having two steering wheels in which one is powered and of a construction along the foregoing lines. In such instances the steering wheels are connected by tie rods or other linkage or by a gear train.

The bearing assembly of the invention is axially assembled and the races have so-called "snap diameters" on the lands of both races so as to hold the bearing together and prevent accidental disassembly during handling, shipment, and installation. However, due to the construction of the bearing, while forming no part of the present invention, it does require protection in use from large, accidental or occasional thrust loads which would tend to disassemble it. In order to prevent such accidental disassembly a clamp ring 35 may be secured to the inner rotatable component of the inner housing 16 by cap screws 36 so that a nominal clearance is provided between the clamp ring and the outer stationary component or outer stationary housing 22. The arrangement provides the protection required to prevent accidental disassembly of the angular contact and thrust bearing assembly 20, as for example when the wheel 4 strikes a curb the inner race at one side of the bearing will tend to move downward relative to the outer race, but its travel will be limited to the clearance between the clamp ring 35 and the outer stationary component or stationary housing 22. Similarly when the wheel 4 passes over a hole the weight of the wheel will engage the inner race of the bearing downwardly until restrained by the clamp ring 35 contacting the outer housing 22. As noted, the clamp ring 35, as such, forms no part of the present invention, and the protection afforded by the clamp ring 35 could be achieved in other ways, such as by the use, as is known in the art, of employing sturdy safety clips.

Referring now to FIG. 3, the inner and outer races 18 and 27, respectively, have slender limber races as compared to their diameters and are provided with opposed machined load bearing surfaces 40 and 42, respectively, between which spaced apart load bearing balls 43, which by way of example may be one-fourth inch in diameter, are arranged with small internal diametral clearance of the order of about .004 to .008 inch between the load bearing surfaces of the bearing races.

In the embodiment of FIG. 2, the load bearing balls are alternately spaced apart by spacer means 44 comprising members of generally cylindrical configuration having concave surfaces 46 in opposite faces thereof facing the load bearing balls 43. The concave surfaces 46 are of a radius slightly in excess of the radius of the load bearing balls 43 providing for minimum frictional contact between the load bearing balls and the concave load bearing surfaces of the spacer members 44 in an arrangement in which the load bearing balls extend circumferentially fully between the races.

In the bearing arrangement of FIG. 8, the load bearing balls 43 are alternately spaced apart by spacer means comprising spacer balls 48 of slightly less diameter than the load bearing balls. For example, if the load bearing balls are one-fourth inch in diameter the spacer balls may be one sixty-fourth inch smaller in diameter.

The utilization of spacers 44 as in FIG. 2 enables the incorporation of 107 load bearing balls of one-fourth inch diameter as compared to 80 load bearing balls in the construction of FIG. 8 for bearing assemblies of the same diameter. The utilization of spacers 44, as in FIG. 2, reduces friction and torque and increases the load carrying capacity but is more costly than the construction of FIG. 8 in which balls are used as spacers. However, in either case the principles of the invention are the same.

An important feature of the present invention is in providing a clearance fit, for example, of the order of about .025 inch between the outer cylindrical surface 47 of the outer race 27 with the inner cylindrical surface 28 of the outer stationary component or outer housing 22 for limited relative radial movement with respect thereto; and a clearance fit, for example, of the order of about .025 inch between the inner cylindrical surface 50 of the inner race 18 with the outer cylindrical surface 33 of the inner rotatable component 16 for limited relative radial movement with respect thereto. Thus the races may move relative to each other axially and radially so that as a thrust load is applied to the outer stationary housing component, the contact angle of the load bearing balls 43 with respect to the load bearing surfaces of the outer race 27 and the inner race 18 is automatically changed, with the result that the load bearing balls and the bearing races are elastically deflected, to provide the most suitable load bearing capacity for the applied load.

Referring now to FIG. 1, a thrust load indicated at $L_1L_2$ is reacted by forces indicated at $F_1F_2$. Upon reference to FIG. 3, which illustrates the pertinent portion of the left hand portion of the load bearing apparatus of the invention, the thrust load applied to the stationary component or stationary housing 22 is transmitted from the outer race 27 through the load bearing balls 43 to the inner race 18 along the line of contact indicated at C. FIG. 3, as well as FIG. 4, illustrates formation of the load bearing surfaces 40 and 42 to provide a nominal contact angle of 30°. The equal and opposite vectors PP in FIG. 3 on the line of contact C represent the normal ball load resisting the forces exerted by the races against the load bearing balls. The vector P may be resolved into its components R and T, where R represents the radially directed component and T equals the thrust loads of FIG. 1. For a given thrust load, the normal ball load and the radial components are at their maximum values, when the contact angle is at a minimum value.

Thus, as the bearings start with a nominal contact angle of 30° as indicated in FIGS. 3 and 4, and as an increasing thrust load is applied to the outer stationary component 22, the radial component R acts to expand the outer race 27 and to contract the inner race 18. This action increases the clearance within the bearing allowing the races to move axially relative to each other. The load bearing surfaces of the inner and outer races are formed so that as they do so, the contact angle of the load bearing balls with the load bearing surfaces of the inner and outer races increases correspondingly.

The radial component must overcome the resistance due to the stiffness of the bearing races, before it can expand and/or contract them.

In FIG. 5, the parts are in positions in which a trust load has been applied to the stationary outer components or outer housing 22 to provide a bearing contact angle of about 45°. Under further heavier thrust loads the contact angle is about 60° as illustrated in FIG. 6. Under still heavier thrust loads the contact angles exceed 75° and may approach but do not attain 90° for maximum thrust capacity as illustrated in FIG. 7. As the contact angle of FIG. 7 approaches 90°, the radial components R approach zero and vectors P tend to become equal to the thrust load (for maximum load carrying capacity). But as the radial components R approach zero, their influence to expand or contract the races is similarly diminished. And so the action described is self-limiting and ceases when an equilibrium is reached between the expansion/contraction force and the resistance of the races.

Referring again of FIGS. 3 through 7, it will be seen that as the contact angle is increased in the manner above described, the radial distance between the lands of the races as indicated at K and M increases. Also, the slight openings between the load bearing balls and the races at $g$ and $i$ increase, while the openings at $h$ and $j$ decrease.

The structure and function described above provide the desired increased contact angle, of the load bearing balls with the load bearing surfaces which are formed to provide the foregoing relationship of the load bearing balls with respect to the load bearing surfaces of the inner and outer races, to obtain the desired increased contact angle and consequently increased load-carrying capacity under thrust load conditions. As the thrust load is increased the load bearing balls and the ball bearing races at their points of contact deflect elastically allowing the races to move further axially relative to each other. As forenoted this causes the contact angle of the load bearing balls with respect to the load bearing surfaces of the bearing races to increase. With regard to bearing friction and torque and capacity, it is desirable to employ a large number of load bearing balls, typically more than one hundred in the structure shown in FIG. 2 as forenoted. Therefore, the load per load bearing ball is low, minimizing the elastic deflection and the resulting change in contact angle. This action, therefore, contributes very little to the desired change in contact angle, normally less than 2°.

In the structure above described, at the normal contact angle of 30° the bearing has ample radial load capacity for those occasions when it is needed, and when little or no thrust capacity is needed, as for example, when the wheel 4 drops into a hole and strikes the far side of the hole.

In summation the present invention is directed to a load bearing apparatus embodying an angular contact radial and thrust bearing assembly in which the load bearing balls adjust their contact angles in response to changing load conditions thereby achieving high radial load capacity and high thrust load capacity in an economical manner.

While this is shown and described with certain preferred embodiments of invention, it will be understood that various modifications and variations and applications thereof may be made therein without departing from the spirit and scope of the invention.

The invention claim is:

1. Load bearing apparatus comprising an outer stationary component have a first annular shouldered recess providing a first race seat having a first base surface and a first inner cylindrical surface extending at right angle with respect to said first base surface, an inner rotatable component having a second annular shouldered recess providing a second base seat in axially spaced parallel relation with respect to said first base seat and a second outer cylindrical surface extending at right angles with respect to said second base seat parallel with but in a direction opposite that of said first cylindrical surface, an angular contact radial and thrust bearing assembly having outer and inner ball bearing races mounted in said race seats of said outer housing component and said inner rotatable component, in radially spaced apart relation said ball bearing races having between them recesses the surfaces of which provide bearing engaging surfaces in opposed facing relation with respect to each other, a plurality of load bearing balls disposed between the ball engaging surfaces of said races with small diametral clearance with respect to the ball engaging surfaces of the bearing races, spacer means between adjacent load bearing balls to dispose said load bearing balls in spaced apart relation circumferentially between said races, said ball bearing races having cylindrical surfaces having clearance fits with respect to the cylindrical surfaces of said outer stationary component and said inner rotatable component, respectively, to provide for relative radial movement of said outer and inner ball bearing races, and said load engaging surfaces of said races being of configurations to provide variable contact angles with said load bearing balls in a range of from about 30° to almost about 90° by elastic expansion and/or contraction of said races upon axial and radial movement of said races with respect to each other upon application of variable thrust loads to said outer stationary member, whereby the thrust load carrying capacity of said ball bearing assembly automatically increases or decreases, respectively, upon increase or decrease, respectively, of the thrust load applied to said outer stationary component.

2. The load bearing apparatus of claim 1 in which said spacer means comprises a plurality of balls of smaller diameter than the diameter of said load bearing balls.

3. The load bearing apparatus of claim 2 in which the outer component is rotating, and the inner component is stationary, and the thrust loads are applied to said inner stationary component.

4. The load bearing apparatus of claim 1 in which said spacer means comprising a plurality of spacer members of cylindrical like configuration having concave recesses in opposite surfaces thereof facing said load bearing balls and of a radius slightly in excess of the radius of the load bearing balls.

5. The load bearing apparatus of claim 4 in which the outer component is rotating, and the inner component is stationary, and the thrust loads are applied to said inner stationary component.

6. The load bearing apparatus of claim 1 in which the load bearing balls are about .25 inches in diameter and the diametral clearance is in the range of about .004 to .008 inches.

7. The load bearing apparatus of claim 6 in which the outer component is rotating, and the inner component is stationary, and the thrust loads are applied to said inner stationary component.

8. The load bearing apparatus of claim 1 in which the outer component is rotating, and the inner component is stationary, and the thrust loads are applied to said inner stationary component.

* * * * *